(12) United States Patent
Steele et al.

(10) Patent No.: US 7,830,299 B2
(45) Date of Patent: Nov. 9, 2010

(54) RADAR SYSTEM FOR MANMADE DEVICE DETECTION AND DISCRIMINATION FROM CLUTTER

(75) Inventors: Daniel W. Steele, Clay, NY (US); Frank S. Rotondo, Manlius, NY (US); Jeffrey L. Houck, Tully, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 313 days.

(21) Appl. No.: 11/998,179

(22) Filed: Nov. 28, 2007

(65) Prior Publication Data

US 2009/0135046 A1    May 28, 2009

(51) Int. Cl.
G01S 7/42    (2006.01)
G01S 13/00   (2006.01)

(52) U.S. Cl. .......................................... 342/22; 342/13
(58) Field of Classification Search ............. 342/13–20, 342/22
See application file for complete search history.

(56) References Cited

U.S. PATENT DOCUMENTS

| | | | | |
|---|---|---|---|---|
| 3,028,596 A * | 4/1962 | McGillen et al. | ............ | 342/351 |
| 3,599,211 A * | 8/1971 | Mardon | ...................... | 342/351 |
| 3,707,672 A * | 12/1972 | Miller et al. | ................ | 324/239 |
| 3,911,435 A * | 10/1975 | Mardon et al. | ............. | 342/351 |
| 4,031,545 A * | 6/1977 | Stein et al. | .................... | 378/57 |
| 4,035,797 A * | 7/1977 | Nagy | ......................... | 342/104 |
| 4,053,891 A * | 10/1977 | Opitz | ......................... | 342/193 |
| 4,951,058 A * | 8/1990 | Schriner et al. | .............. | 342/61 |
| 5,073,782 A * | 12/1991 | Huguenin et al. | .......... | 342/179 |
| 5,177,445 A * | 1/1993 | Cross | ........................ | 324/637 |
| 5,191,343 A * | 3/1993 | Danzer et al. | ................. | 342/21 |
| 5,227,800 A * | 7/1993 | Huguenin et al. | .......... | 342/179 |
| 5,381,153 A * | 1/1995 | Saito et al. | .................... | 342/70 |
| 5,552,705 A * | 9/1996 | Keller | ........................ | 324/239 |
| 5,598,152 A * | 1/1997 | Scarzello et al. | ............ | 340/850 |
| 6,057,765 A * | 5/2000 | Jones et al. | ............... | 340/572.2 |
| 6,163,259 A * | 12/2000 | Barsumian et al. | ....... | 340/572.2 |
| 6,243,036 B1 * | 6/2001 | Chadwick et al. | ............. | 342/27 |
| 6,359,582 B1 * | 3/2002 | MacAleese et al. | ........... | 342/22 |
| 6,480,141 B1 * | 11/2002 | Toth et al. | ..................... | 342/22 |
| 6,765,527 B2 * | 7/2004 | Jablonski et al. | ............ | 342/193 |
| 6,897,777 B2 * | 5/2005 | Holmes et al. | ........... | 340/572.2 |
| 6,914,552 B1 * | 7/2005 | McEwan | ...................... | 342/22 |
| 6,967,612 B1 * | 11/2005 | Gorman et al. | ............... | 342/22 |
| 7,109,910 B1 * | 9/2006 | Steinway et al. | .............. | 342/22 |
| 7,162,285 B2 * | 1/2007 | Owens et al. | ............ | 455/575.5 |
| 7,167,123 B2 * | 1/2007 | Hausner et al. | ............... | 342/22 |
| 7,183,964 B2 * | 2/2007 | Steinway et al. | .............. | 342/22 |
| 7,205,769 B2 * | 4/2007 | Fujiwara | ..................... | 324/337 |
| 7,450,052 B2 * | 11/2008 | Hausner et al. | ............... | 342/22 |

(Continued)

*Primary Examiner*—Thomas H Tarcza
*Assistant Examiner*—Peter M Bythrow
(74) *Attorney, Agent, or Firm*—Howard IP Law Group, PC

(57) ABSTRACT

A radar system for detecting the presence of threat providing electronic manmade devices placed in a given area of operation comprising: a radar transmitter for transmitting a radar signal designated as a probe signal to the given area of operation to cause said threat providing devices to produce anomalous energy signals, a radar receiver for receiving a reflected radar signal from said area of operation including said anomalous energy signals, designated as Target Anomalous Response (TAR) signals, a circuit responsive to the received signal for processing the signal to detect the (TAR) anomalous energy signals indicative of a threat producing device.

20 Claims, 4 Drawing Sheets

U.S. PATENT DOCUMENTS

| | | | |
|---|---|---|---|
| 7,512,511 B1 * | 3/2009 | Schultz et al. | 702/127 |
| 7,598,898 B1 * | 10/2009 | Funk et al. | 342/22 |
| 7,626,400 B2 * | 12/2009 | Holbrook et al. | 324/642 |
| 7,639,178 B1 * | 12/2009 | Mulbrook et al. | 342/146 |
| 2003/0034444 A1 * | 2/2003 | Chadwick et al. | 250/225 |
| 2004/0041724 A1 * | 3/2004 | Levitan et al. | 342/22 |
| 2004/0095243 A1 * | 5/2004 | Holmes et al. | 340/572.2 |
| 2005/0064922 A1 * | 3/2005 | Owens et al. | 455/575.5 |
| 2006/0082488 A1 * | 4/2006 | Keller, III | 342/22 |
| 2007/0013577 A1 * | 1/2007 | Schnitzer et al. | 342/90 |
| 2008/0129581 A1 * | 6/2008 | Douglass et al. | 342/52 |

* cited by examiner

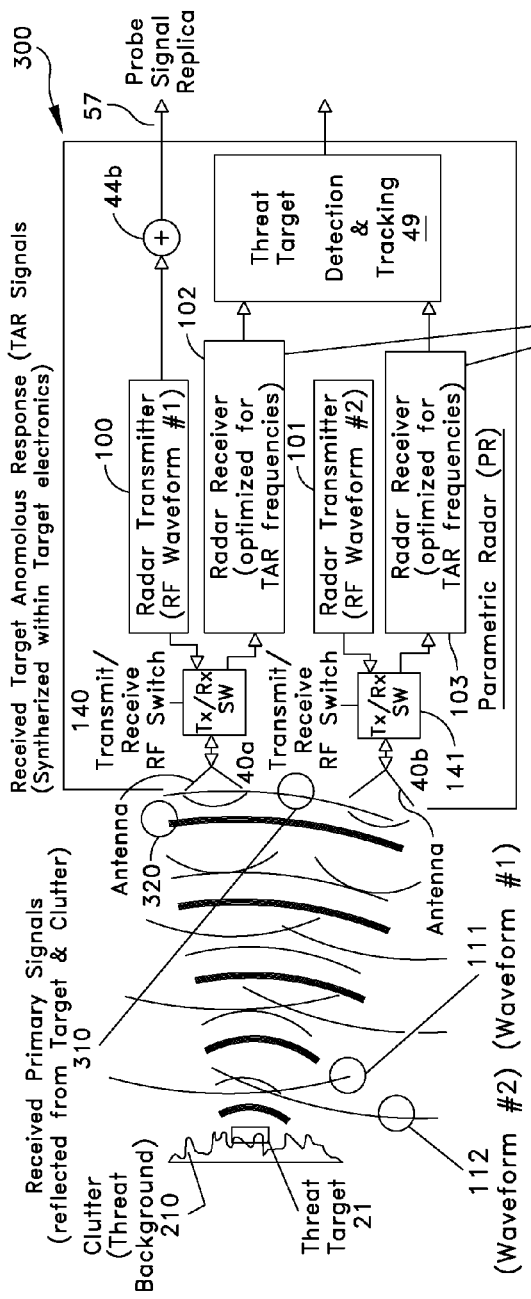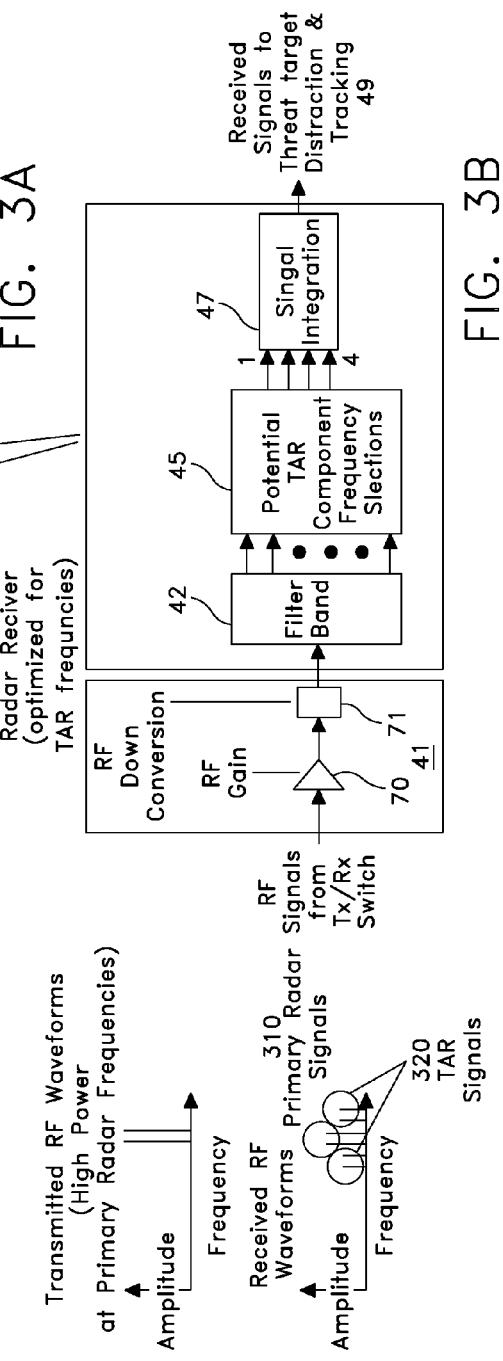

RADAR SYSTEM FOR MANMADE DEVICE DETECTION AND DISCRIMINATION FROM CLUTTER

FIELD OF INVENTION

This invention relates to radar systems and more particularly to a parametric radar employed for manmade device detection.

BACKGROUND

There have been many threats against various facilities and human rights promulgated by terrorists or other groups intent on destroying property and killing people in order to impart panic and terror in today's society. Many of these threats and attempts at disruption employ man made devices, which devices can be placed in a small vehicle or hidden in conventional places. Such threat enabling devices may be activated by means of remote control or various other mechanisms, and explode at will. It is often difficult to detect or otherwise discriminate such man made devices from their environment by conventional means. The detection and location of these man made devices is of great importance in mitigating many kinds of threats.

Small threats are typically very difficult to detect since they are of low radar cross-section, may be slow moving, or perhaps static, and may be situated in an environment of clutter interference. For example, of importance is the detection of electronic hardware or circuits associated with small classes of weapons and unmanned vehicles. This is especially true in the detection of small UAV systems. In such circumstances, conventional radars that depend upon primary (or direct mirror-like) radio reflections of their transmitted wave forms are relatively non-effective detectors of man made devices and of such threats. In a conventional radar system, increasing the illuminating signal power and correspondingly the energy returned from such objects within a radar beam to achieve improved transmission/range or improved detection sensitivity does not fundamentally improve an object's signal to clutter signal ratio and thus it's detectability under clutter dominated conditions (note that in this instance both the signal power of the object and it's background clutter power will be raised by the same degree and that this does not increase the object's signal to background clutter power ratio that is fundamental for increased detectability). Increased radar receiver gain yields the same, no net detection value result under clutter dominated conditions. Thus, by providing greater transmitted radar illumination power and/or greater receiver gain, one does not change the object's signal to clutter signal ratio. Moreover, Doppler discrimination is of limited value in the discrimination of slow moving or static objects of interest within a background of clutter having similar behavior. It is understood that if one has a non-moving object then Doppler radar is ineffective in detecting the object.

In combination with the above-noted problems the additional challenge of detecting weak signals from relatively small objects within a large background of interfering signal energy is extremely difficult utilizing conventional radar systems. Secondary radars or transponders are typically employed to detect and track the above-noted types in like environments. However, these objects must be technically cooperative or friendly in the sense of operating active transponding electronics designed for such applications. Thus, as one can ascertain, one can track a small vehicle by conventional radars if the vehicle contains a suitable transponder, and therefore is capable of returning a signal which can be detected as distinct from background signals. However, non-cooperative targets would not use such transponders. For example, a terrorist utilizing a small vehicle or having a man made destructive device on the vehicle would not incorporate or use such transponders.

In order to solve the above-noted problems a parametric radar system utilizes radio energy analogous to that associated with conventional radars. However, the system is designed to ignore or otherwise not receive or process primary or directly reflected energy from objects.

SUMMARY

A parametric radar (PR) system transmits radar signals, which signals are designed to promote the production of anomalous RF energy within electronic devices contained in a threat vehicle or other device/object. Such radar transmitted signals may be referred to as probe signals. Probe signals can be directed to impinge upon the threat object and due to electronic non-linearities therein causing such electronics to produce target anomalous response signals, which response signals are returned to the radar and which are processed by the processing circuitry in the radar system to provide output signals indicative of the nature and location of the threat target. The PR system anticipates the effects that the probe signals will produce due to known classes of nonlinear effects and thereby optimizes the receiver and detection of such objects while rejecting signals of non-interest from other passive reflections at primary radar signal frequencies. The signals from the PR radar pulses which generate the TAR (Target Anomalous Response) signals or return energy that is manufactured within a targeted electronic object by its associated device non-linearities and by related RF convolution mixing and harmonic distortion. These signals can be at a PR radar signal harmonic and/or at radar signal cross-product frequencies.

BRIEF DESCRIPTION OF THE DRAWINGS

FIG. 3A is a system block diagram of processing apparatus for producing and receiving signals according an embodiment of the invention.

FIG. 3B is a block diagram of an exemplary receiver suitable for use within the system of FIG. 3A.

DETAILED DESCRIPTION OF THE PREFERRED EMBODIMENTS

Figure 1:
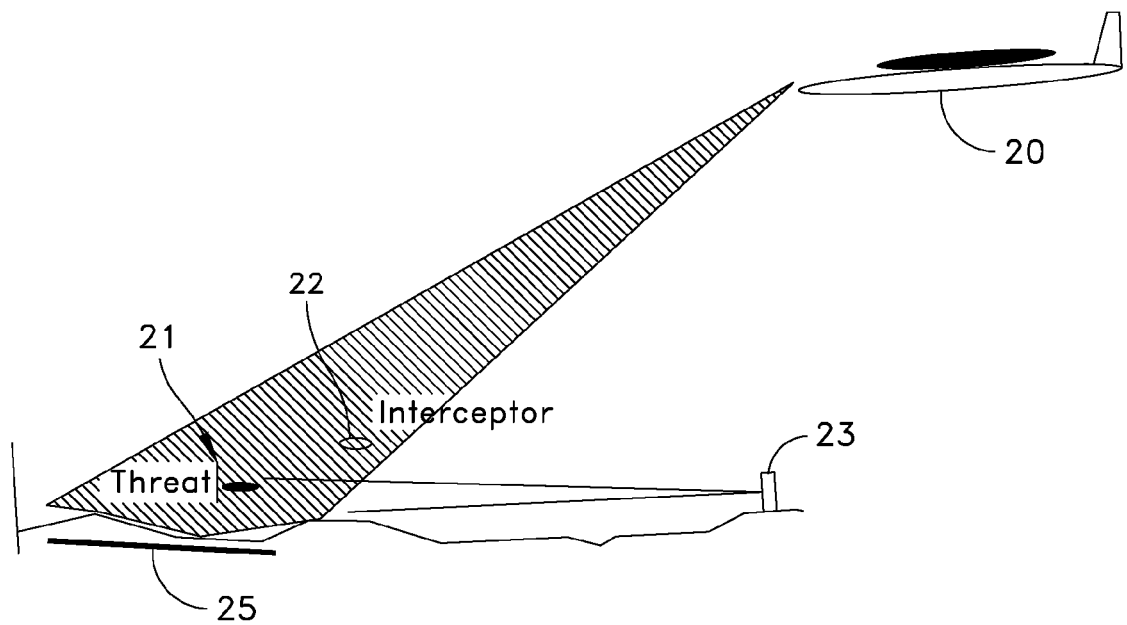
FIG. 1 depicts an application of a high power, parametric radar system according to an embodiment of the invention.

Referring to FIG. 1 there is shown a parametric radar system according to an embodiment of the present invention, which system can be implemented for example, as an airborne radar, surface radar, interceptor or can employ all of the above. FIG. 1 depicts a schematic view of an aircraft 20 having a high power radar located thereon. The high power radar is directed to an area of operation 25. The area of operation is an area which for example is known to include a small unmanned vehicle threat or object 21. The object 21 may be a slow moving automobile or truck or a slow moving device or a static device. The area of operation 25 may contain a great deal of ground clutter which would normally interfere with the reflective signals from conventional radar systems. The threat area can be covered by a surface radar 23 which also directs a high power beam within the area 25 which beam will impinge upon the vehicle threat 21. Also shown is an interceptor 22, which interceptor device is located within the desired area, and which interceptor device 22 will receive the signals reflected by the transmission from the airborne radar 20 or by the ground surface radar 23. It is of course understood that all such devices can be employed and therefore one can utilize an airborne radar system 20 in conjunction with a surface radar system 23 and interceptor 22.

Figure 2:
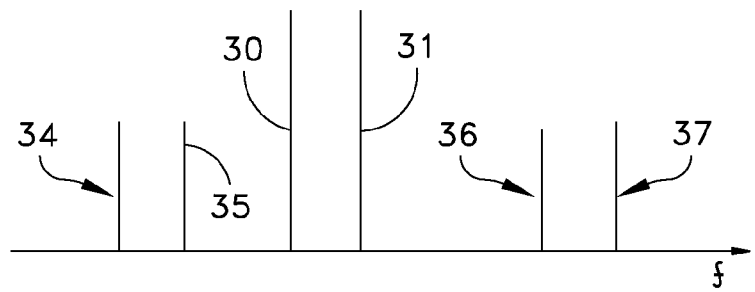
FIG. 2 depicts typical transmitted and received signal spectra according to an embodiment of the invention.

Referring to FIG. 2, there is shown one class of receive spectra which would be processed by the parametric radar system according to an exemplary embodiment of this invention. As seen in FIG. 2 the center frequencies designated as 30 and 31 are typical transmitted frequency spectra such as would be transmitted by the airborne radar or by a surface ground radar. The transmit spectra 30 and 31 are shown and they are transmitted at high power. Shown adjacent thereto are target anomalous responses (TAR) as for example 34 and 35 to the left of signals 30 and 31, and 36 and 37 to the right thereof. These TAR signals are those responses which would be received and processed by the parametric radar and would be indicative of vehicle or other threats located within the area.

Referring to FIG. 1 in conjunction with FIG. 2, the parametric radar (PR) system utilizes radio energy somewhat analogous to that associated with conventional radars. However, the system is adapted to ignore or otherwise not receive or process primary or direct reflections from remotely located objects such as the threat object 21. Conventional radars utilize primary returns from objects and depend upon various means to reject clutter interference that competes directly with a targeted object's primary return. The objective of these processes is to yield a sufficiently positive signal to clutter power ratio for reliable detection and subsequent location of the targeted object. Radars utilize spatial directivity, temporal sampling, frequency filtering, signal correlation, normalization and Doppler discrimination processes as fundamental tools to separate primary returns from a target object of interest and from competing reflections that originate from nearby objects of minor interest. None of these techniques by themselves adequately allow for the discrimination of man made electronic objects from passive objects which is the objective of the PR system. The PR system generates signals designed to promote the production of anomalous RF energy within electronic devices to be detected. Such PR generated signals are referred to as probe signals. The PR system not only transmits probe signals appropriate to elicit non-linear responses from electronic devices, it also anticipates the effects of those probe signals as potentially manifested within the energy returned from electronic objects/threats/targets of interest. The system does this in order to optimize the detection of such objects and otherwise reject signals of non-interest.

For example, anomalous energy at harmonic and/or cross-product frequencies can be manufactured within an electronic object by device/component nonlinearities and related RF convolution (mixing). Signal energy derived from such anomalous responses can be engineered to occur at other than normal primary radar frequencies or be otherwise separable from energy directly reflected from objects within the radar beam. The type and degree of separation anticipated as a response from the probe signal drives detection parameters within the PR radar that in turn uniquely tag objects of interest while rejecting energies from most passive or non-electronic objects. This energy rejection mechanism thereby eliminates the majority of clutter interference associated with non-electronic objects. In a conventional radar system, increasing the signal power illuminating and therefore energy returned from objects within a radar beam, either through improved transmission or improved receive sensitivity (greater radar illumination power, gain) does nothing to effect a fundamental change in returned object signal to clutter signal ratio. Both signal and clutter scale together in a linear fashion result in no net first order improvement in the radar's ability to discriminate the desired object from clutter. Increased illumination in a PR system on the other hand, promotes significant signal nonlinearities within electronic objects being illuminated and attendant potentials for higher returned power at harmonic and cross-product frequencies. The class of anomalous response is referred to as the Target Anomalous Response (TAR). This of course has been discussed in conjunction with FIGS. 1 and 2. While both electronic and non-electronic objects may be simultaneously illuminated within a PR transmission there is essentially no power returned at TAR frequencies of interest from normal (non-electronic) objects. Direct reflections from non-electronic objects are at primary or probe signal frequencies and not at receiver/detector anticipated TAR frequencies.

Thus, the signal to clutter (or "signal to noise") power ratio at TAR associated cross-product frequencies increases as the illumination power increases. The effect is non-linear and can be dramatic at high illumination power such as to clearly delineate slow moving or static electronic objects of interest from surrounding reflections originating from inanimate objects such as trees, animals or other non-electronic objects. Given that the transmitted direction of probe signals is known and/or received TAR direction is determinable using conventional radar techniques, one can define the bearing angle to the target. Given that the probe signal is modulated analogously to a conventional radar (e.g. pulsed radar) one can utilize the round trip time from probe signal transmission to reception of the TAR as a ranging measurement as in normal radar processing. Thus PR can determine a target's location.

One possible class of probe signal useful within a PR system is one containing two (or more) carriers, separated by a known frequency (or frequencies), both generated simultaneous within the envelope of the transmitted signal. Referring to FIG. 2 these two carriers are represented by numerals 30 and 31. Possible cross-product TAR signals generated from such an illumination signal are represented by a family of signals with each signal component separated from its neighbor by the carrier frequency separation within the probe signal. These signals are represented by numerals 34, 35, 36 and 37 of FIG. 2. Typically the first set of newly generated TAR carriers, those closest in frequency to the Probe transmitted carrier, is the strongest and is referred to as third order cross-product terms. Given such a dual carrier probe signal spectrum as depicted in FIG. 2, processing within the PR receiver can include a bank of filters with frequency range, spacing and resolution that match that of possible TAR. The PR system can appropriately select, combine and otherwise optimize detection of TAR from that of the primary returns (and other noise) that can potentially compete with or mask the TAR signal. Thus signal detection is enhanced by avoiding clutter dominated probe signal filter bank outputs. In an exemplary configuration, the threat providing electronic device includes a radio receiver having electronic circuitry containing one or more non-linear devices (e.g. a diode) responsive to the probe signal to cause the threat providing electronic device to produce TAR signals. The electronic circuitry may include a circuit board such as a printed circuit board or PCB containing one or more non-linear devices. In another exemplary configuration, the threat providing electronic device includes a radio receiver having an external antenna, where the external antenna receives the probe signal to cause the threat providing electronic device to produce TAR signals.

Referring now to FIG. 3A, there is shown a general block diagram of a radar system and associated processing components according to an embodiment of the present invention. As shown in FIG. 3A, antenna 40a is coupled to transmit/receiver (Tx/Rx) switch 140. The switch 140 couples the antenna 40a to the radar transmitter 100 in a transmit mode for transmitting RF waveform 111 (RF Waveform #1) toward an object 21 in order to attempt to elicit anomalous RF energy from electronic components/circuitry associated with the object. In similar fashion, antenna 40b is coupled to Tx/Rx switch 141. The switch 141 couples radar transmitter 101 which transmits RF waveform 112 (RF Waveform #2) during a transmit mode toward object 21. The Tx/Rx switches 140, 141 are also coupled to respective radar receivers 102 and 103. Both receivers 102 and 103 are coupled to the Threat Target detection and tracking processor 49. Processor 49 operates in conventional fashion to measure various signal parameters associated with the output from receivers 102, 103 such as signal output power, signal direction and history (include range and/or angle history) for radar operator or other such use.

In operation, probe signals having waveforms 111, 112 as shown in FIG. 3A are transmitted from the radar assembly 300 via antennas 40a, 40b and impinge on object or threat target 21. In receive mode, radar return signals are received by the antennas 40a, 40b and include received primary signals 310 (reflected from the target and associated background or clutter 210), in addition to TAR signals 320 transmitted from the threat target 21 in response to stimulation via the probe signals. The received signals are passed to the radar receivers 102, 103 via the respective Tx/Rx switches (operating in receive mode). The radar receivers may be adapted so as to anticipate the effects of the probe signals as potentially manifested by the energy returned from the targets and optimized for detecting the resulting TAR frequencies while otherwise rejecting signals of non-interest. Detection and tracking processor 49 coupled to the radar receivers 102, 103 operates to process the received signal data for determining TAR energy signals indicative of passive threat target device 21.

Figure 3C:
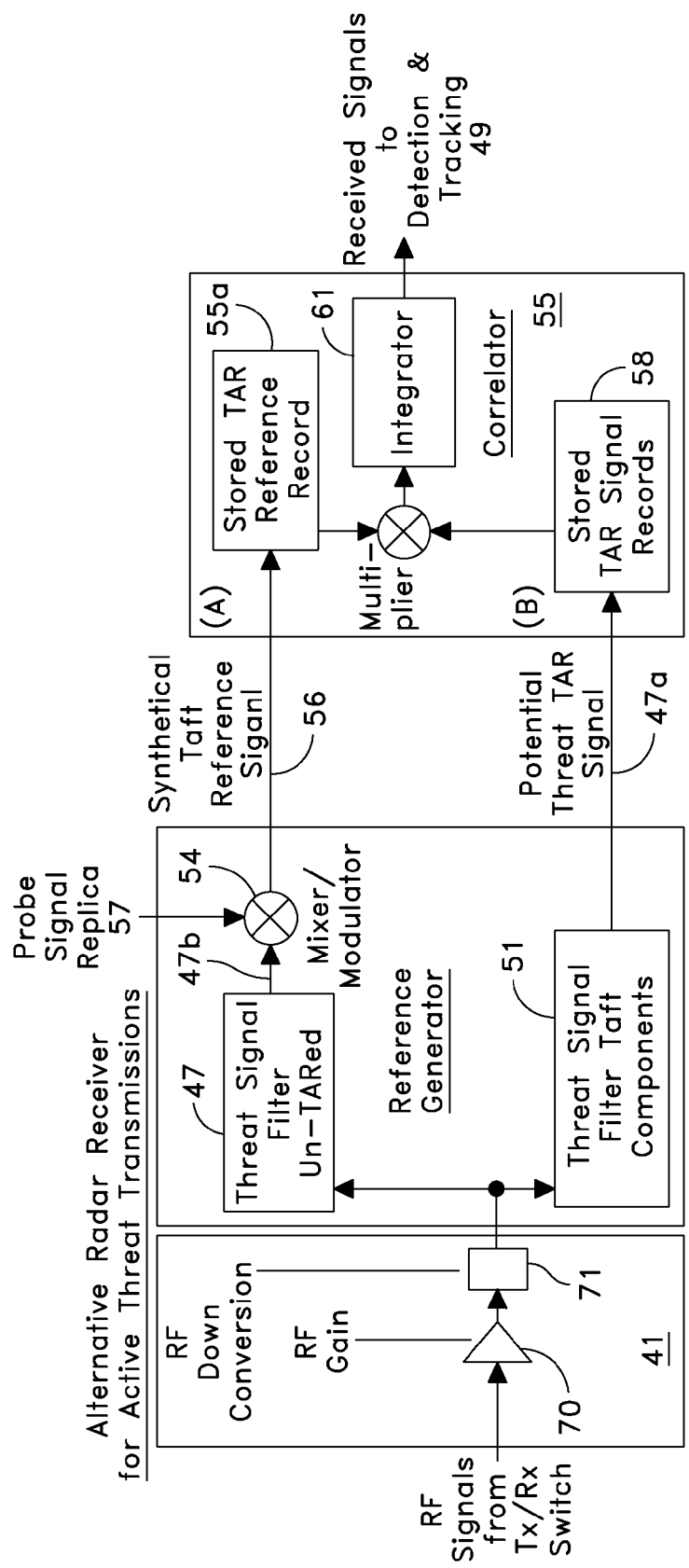
FIG. 3C is a block diagram of another exemplary receiver suitable for use within the system of FIG. 3A.

FIG. 3B shows a radar receiver configuration which can be employed as receiver 102 and 103 of FIG. 3A. An alternative receiver configuration is shown in FIG. 3C which also can be employed as receiver 102 and/or receiver 103.

Referring now to FIG. 3A and FIG. 3B, the received or return signal which enters antennas 40A and 40B are conventionally amplified or otherwise processed in preprocessing module 41 and applied to a bank of filters 42. Module 41 includes RF amplifier 70 and RF downconverter 71 having its output applied to filter bank 42. Each filter in the filter bank is set at a particular frequency and is separated from one another in frequency based on the transmitted probe signal frequencies so as to allow one to discriminate between desired and undesired signal frequencies. For example, for a static target or a Doppler compensated radar receiver, the filter bank is adapted so that the frequency separation of the two primary transmitted signals is used to anticipate projected TAR signal frequency locations (above and below the two primary signals). In one configuration, the frequency difference between the two primary signals is used (e.g. doubly added) to obtain two TAR signal locations above the higher primary signal, and likewise by subtracting (doubly) the two primary signals using the lower primary signal, such that two additional TAR signal locations (below the lower of the primary signals) are obtained. Thus, in the illustrated embodiment a total of four TAR signal components can be individually integrated (via signal integration module 47) and passed to the power detection circuitry 49.

As one can see, the outputs $TAR_1$ to $TAR_N$ of filter bank 42 are directed to the input of processing circuit 45. The processor circuit 45 enables determination and selection of potential TAR component frequencies according to the received and filtered RF signal data and has an output which is directly input to signal integration circuit or module 47 which provides as an output the received signals to module 49 for subsequent detection and tracking (FIG. 3A).

As one can ascertain, electronic objects come in a variety of forms, with differing attributes and resulting susceptibilities to PR probe signals and detection. Most electronic devices however, can be generally described as having the ability to couple RF energy to and from free space, whether directly in the form of a discrete antenna or indirectly as a consequence of interconnections and enclosures. One particularly important class of electronic object that is germane to detection by the present PR system and which would be included in unmanned vehicles and other threats is the radio receiver. Radio receivers are necessary command and control links critical to threat function. As such, radio receivers are attached to an external antenna optimized for the receipt of weak radio signals over operational frequency ranges. Antennas provide an ideal means by which PR probe signals can enter and create suitable TAR within radio receiver electronics at designed receive frequencies and/or otherwise susceptible ones (harmonically related, image related . . . etc.). Additionally, if the probe signal spectrum is dynamically changed or swept across the frequency band associated with known threats susceptibilities, the system may be able to optimize the probability of detecting threat receivers and locating them in range and bearing. Once detected, the specific probe signal frequency versus TAR frequency and amplitude responses can be captured as a record. This record of TAR signature susceptibilities may in addition be used to effectively fingerprint and/or identify and track particular threats.

Another important class of electronic object for PR detection and localization is the radio transmitter. Note that transmitter bearing is often the only localization parameter determinable by conventional radio location devices; thus the addition of a PR ranging function is significant. This and the ability to dual utilize radar assets for both passive & active localization provide significant advantages to the use of PR. Radio transmitters are associated with key threat communications equipment required to relay sensor data, provide status and acknowledge commands. They are often associated with corresponding receivers and their transceiver architecture, such as a cell phone or other transceiver arrangements. Transmitters alone, whether they are actively transmitting through an antenna or simply connected to an antenna can generate TAR effects like those previously discussed for receivers. However, when one examines an actively transmitting system, there is an additional attribute of interest. The relatively high levels of RF power associated with final stages of the transmitter can act in the role of a local oscillator, mixer and modulator. Mixing between the signal to be transmitted (acting as a local oscillator) with an incoming probe signal provides an opportunity for the generation of significant amounts of TAR. The TAR generated will be the convolution of the spectrum of the "native" threat transmitter spectrum and the spectrum of the incoming probe signal. As a result, newly generated TAR will have spectral components that exceed the product of both spectrums. Given that high levels of TAR are generated that are outside the native threat transmission spectrum, broad amplitude/energy detection techniques in the TAR band may be sufficient to ensure detection and localization. Localization can be performed by measuring round-trip delay to derive range and PR beam steering to derive bearing.

It is possible to provide a means to achieve additional sensitivity in the detection of threat transmitter generated TAR signals. This can be performed while also providing rejection of the generally strong transmitter signal itself, by processing PR receive signals within a TAR signal matched correlator. The objective is to apply correlation gain to TAR components while suppressing noise, components of the transmitter signal and those components associated with primary reflections of the PR probe signal itself.

It is important to derive a suitable TAR correlation reference signal in the face of a spectrally dynamic, data modulation driven threat object transmitter spectrum. In order to accomplish this, the PR system provides a receiver processor function that generates a baseline TAR or TAR reference signal (synthesized TAR Reference signal) by first filtering the un-TARed threat object transmitter signal components from the received signals that include both PR Probe and TAR signals. This is illustrated with reference to the receiver of FIG. 3C adapted for active threat transmissions, wherein the received RF signals from the Tx/Rx switches are preprocessed via module 41 and provided to threat signal filter module 47 which operates to filter the un-TARed threat object transmitter signal components and provides this to the input of mixer 54 whereupon continuously available probe signal replicas 57 are modulated with the unTARed threat object transmit signal components. The filtered threat object transmitter signal 47b is independently convoluted with a locally derived PR probe signal replica 57 within the PR processor itself as shown at module 54. (The probe signal copy can be a suitably range matched replica of the PR signal that would have impinged upon the threat transmitter for the currently being received TAR signal or simply be a continuously applied, CW spectrum). This reference signal 56 thus represents potential TAR components as a real time emulation of the convolution that potentially occurred within the threat object 21 transmitter, at the time the probe signal arrived there, for the time length of the probe pulse. In other words, the convolution circuit operates to process the filtered threat transmitter signal with the probe signal copy. This results in a real time emulation of the potential convolution occurring within the threat transmitter, at the time the probe signal would have arrived there. This emulation can also be accommodated in the correlator circuit 55 shown in FIG. 3C.

In any event, the probe signal replica 57 is obtained from mixer 44b of FIG. 3A. By applying the synthesized TAR signal 56 to one input (A) and the potential threat TAR signals 47a output from filter module 51 (which performs filtering for the TAR signal components of the received signal) to the other input (B), correlations between the internally derived PR processor reference and incoming signals provide a signal/correlation time record upon which to base threat detections. This is performed by correlation module 55 of FIG. 3C. As previously described, mixer 54 provides a synthesized TAR reference signal which is applied as shown at input (A) and in the exemplary illustration stored in memory as indicated by stored TAR reference record module 55a. This enables a sampled history of the data that may be processed in non-real time as is understood by those skilled in the art. In similar fashion, the anticipated TAR signal spectrum 47a from filter 51 is applied as shown at input (B) and in the exemplary illustration stored in memory as indicated by stored received TAR signal record module 58. The potential threat TAR signals from memory 58 and TAR reference signals from memory 55a are combined in multiplier 60. The output of multiplier 60 is then integrated by baseband integrator 61 and again provides as an output signal vector information corresponding to the received signals for power detection and tracking via processing circuitry 49 (FIG. 3A).

Typical of signal correlators, sets of overlapping time sampled data records are independently generated for both TAR received signals and for the new reference signal. A subsequent multiplication, signal time sample by respective reference time sample, followed by integration over a given record length of the resulting products produces a single correlation time sample for each correlated record. Correlation in this manner can result in a TAR signal matched filter gain proportional to the record length processed. Thus the correlation approach as previously discussed is able to use knowledge of the threat transmission itself, which in the case of a modulated threat transmission may be spectrally dynamic, in conjunction with stored knowledge of the probe signal and its anticipated effects upon the threat transmission, to synthesize a correlation reference signal and perform related correlations in search of localization information. This correlation process provides ranging, important in the localization of the source of a given threat transmission. The above techniques are applicable in the localization of both ends of a communications link e.g. both the unmanned threat itself and of manned threats employed in the control and data processing ends of its communications link.

One may gain high strategic value in implementing the above described technique. Command and control assets include ground control stations, airborne control stations and possibly intermediate relay stations which can be manned or unmanned stations.

In another area of PR application one can employ a bi-static radar technique to advantage. An example of this would be the use of an airborne PR as an illuminator for both air and surface searches, while employing a remotely located TAR receiver, that may be in local proximity to potential threats. This, for example, can be employed in FIG. 1 as using an airborne system 20 and the interceptor 22. Local proximity gives a sensitivity advantage to the TAR receiver, being local to the threat, as well as a way to avoid integration issues on the airborne PR platform and a need for high power PR generation at the TAR receiver. The receiver can perform ellipse based ranging with knowledge of the probe signal transmission time and locations of both PR platform and TAR receiver. Antenna directivity at the TAR receiver provides further refinement. Given mobility, this bi-static receiver can be employed to physically home in on detected threats. Thus, as one can ascertain, the system proposed and indicated above has many novel attributes which include the high signal to clutter detection aspects of only processing TAR signals. The system has the ability to work with both active and passive target objects and has the flexibility to match a wide range of threats. The system can work with existing high power radars and can exploit current Doppler processing at higher TAR frequencies.

A PR Probe spectrum can be generated as a composite of two separate radars and transmission signals working cooperatively, with individual spectral components assigned to each of the radars. In one configuration, two relatively simple radars, one airborne and one terrestrial, for example, can cooperatively illuminate common search volumes to detect & localize potential PR responses.

Figure 4:
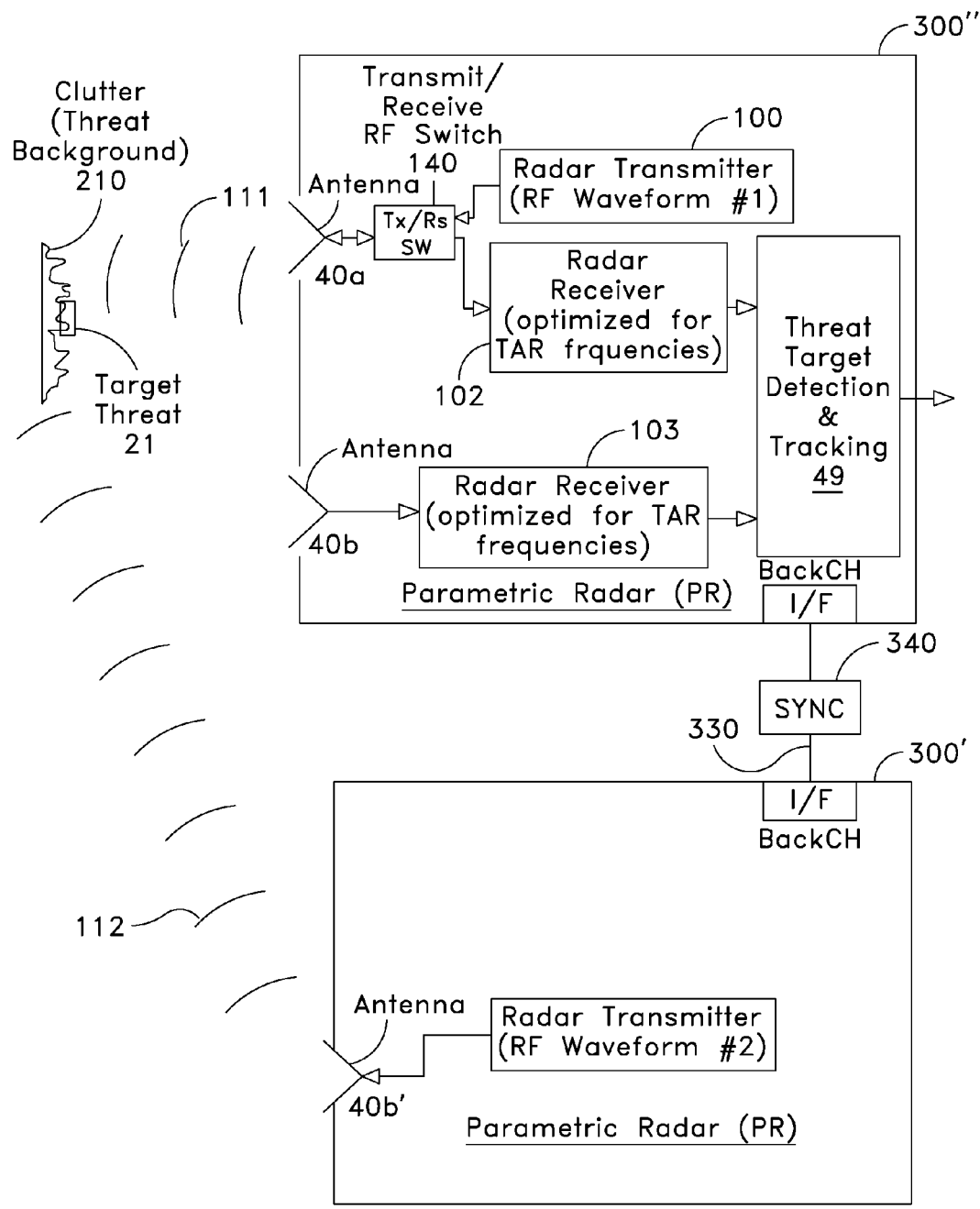
FIG. 4 is a block diagram of processing apparatus for producing and receiving signals according an embodiment of the invention.

FIG. 4 shows a simplified embodiment wherein a first radar system 300' (e.g. a fixed terrestrial platform) and a second radar system 300" (e.g. an airborne platform) cooperate to illuminate a same area containing a target of interest. In an exemplary embodiment, and referring to FIG. 4 (in conjunction with the elements illustrated in FIG. 3A), the airborne radar platform 300" includes the same functional elements as shown in FIG. 3A except that only element 40a operates as a transmitter in transmit mode to transmit an appropriately formed waveform to illuminate the target area while both 40a and 40b of radar 300" operate to receive and process the received or returned signals. In this manner, the configuration of radar system 300" differs from that of system 300 of FIG. 3A by the omission of various modules. Fixed platform 300' comprises a transmitter 40b' that operates to transmit an appropriately formed waveform to illuminate the target area. Additional receiver/processor functionality is not needed in this configuration. For purposes of clarity, only the transmit waveforms are illustrated onto the target volume.

A communication backchannel link 330 may be established between radars 300' and 300' to coordinate certain information such as GPS data, scheduling of the fixed terrestrial platform transmission times, and global position of the target volume, for example. Through this synchronization (shown schematically as module 340) the transmit pulses from each of the waveforms 111, 112 of FIG. 4 arrive at the same time both spatially and temporally. Information as to the location to illuminate, angle, range, transmit coordinates and the like may thus be coordinated. Based on the velocity of the moving platform the TAR components may be determined to arrive at appropriate frequency differentials (i.e. using Doppler frequency analysis). Thus, processing at the receiver associated with moving platform 300" operates in similar fashion to that depicted in FIG. 3A except for taking into account the appropriate Doppler waveform shifts associated with the moving platform and the resultant change in TAR component spacing as received by the processor. While the above example describes a first moving platform and a second fixed platform, it is also contemplated by the present invention to utilize two moving platforms with appropriate Doppler frequency discrimination processing to provide appropriate TAR components associated with a targeted device. Furthermore, it is also contemplated that the receiver functionality may reside only on either one or the other of the two radar platforms or subsystems, with a single transmitter configured on the other one of the platforms.

To further enhance effectiveness the spectrum of the PR formed convolution (TAR emulation) can be further tailored to exclude all but optimal spectral components of the anticipated TAR. Thus, the output from the convolution circuit and an output from the processing circuit is directed to the corrrelator. This basically provides correlation gain to the TAR components while further suppresses the main components of the transmitter signal and those components associated with primary reflections of the PR probe signal itself. Repeated correlations are performed between the PR derived reference and incoming signals to provide a signal/correlation time record upon which to base threshold detections. The threshold detection occurs in module 49 which after the above-noted steps provides a signal indicative of the particular type of threat as described above, which threat is located within the threat area.

It would be apparent to those skilled in the art that there are many modifications which will be deemed to be obvious and are encompassed within the spirit and scope of the claims appended hereto.

What is claimed is:

1. A radar system for detecting the presence of at least one threat providing passive electronic device placed in a given area of operation comprising:
   a radar transmitter for transmitting a radar signal designated as a probe signal to said given area of operation to cause said at least one threat providing device to produce anomalous energy signals,
   a radar receiver for receiving a reflected radar signal from said area of operation including said anomalous energy signals, designated as Target Anomalous Response (TAR) signals, said radar receiver including a bank of filters, each filter having at least one of a different frequency range and resolution that is matched to a given TAR signal such that each filter selectively propagates a different frequency TAR signal from said reflected radar signal at its output, and
   means responsive to said received signal for processing said signal to detect said (TAR) anomalous energy signals indicative of said at least one threat producing device.

2. The radar system according to claim 1, wherein said probe signal contains two carrier frequencies separated by a known frequency to cause said at least one threat providing device to generate a family of anomalous energy signals with each signal in said family separated from a neighbor signal by said known frequency.

3. The radar system according to claim 2, wherein said at least one threat providing electronic device includes a radio receiver having electronic circuitry containing one or more non-linear devices responsive to said probe signal to cause said threat providing electronic device to produce TAR signals.

4. The radar system according to claim 2, wherein said at least one threat providing electronic device includes a radio transmitter associated with an antenna, wherein said antenna receives said probe signal to mix with the threat transmitted signal to produce said TAR signals.

5. The radar system according to claim 1 wherein said means responsive to said received signal includes a correlator for processing said received signal to provide amplified TAR signals.

6. The radar system according to claim 1, wherein said radar transmitter is an airborne transmitter.

7. The radar system according to claim 1 wherein said radar transmitter is a surface transmitter.

8. The radar system according to claim 1, further including an interceptor positioned to receive said reflected radar signals from said area of operation and to process said signals to provide TAR signals.

9. A method of detecting manmade devices as those employed to create threats and destruction using electronic circuits located on unmanned vehicles, present in an area of operation, said method comprising the steps of:
   transmitting radar probe signals into said area of operation to cause said electronic circuits to produce anomalous RF energy signals designated as Target Anomalous Response (TAR) signals,
   receiving reflected radar probe signals and said TAR signals from said area of operation,
   processing said received signals to isolate said TAR signals, and detecting said threat by analyzing said processed TAR signals,
wherein the step of processing said received signals includes filtering said received signals via a plurality of filters, each of said filters set to a bandwidth matching that of a possible TAR, the output of said filters providing a plurality of TAR signals.

10. The method according to claim 9, wherein said electronic circuits into which said transmitted probe signals enter include a radio receiver and cause said receiver to produce TAR signals indicative of the presence of said radio receiver.

11. The method according to claim 9, wherein said electronic circuits include a radio transmitter associated with an antenna where said transmitted probe signals cause said radio transmitter to produce TAR signals indicative of the presence of said radio transmitter.

12. The method according to claim 11, wherein said electronic circuits includes an active transmitter associated with an antenna, wherein RF power from said active transmitter mixes with said probe signal to produce high power level TAR signals.

13. The method according to claim 9, wherein the step of transmitting radar probe signals includes simultaneously transmitting two carrier signals separated by a known frequency to cause said electronic circuits to produce a family of TAR signals with each signal component separated form its neighbor by the carrier frequency separation within the probe signal.

14. The method according to claim 9, further including the step of processing said received signals with a signal correlator to provide additional detection sensitivity, wherein said transmitted probe signal is suppressed by said correlator.

15. The method according to claim 9, further including the step of storing said isolated TAR signals indicative of a particular threat.

16. The method according to claim 14, wherein said signal correlator applies correlation gain to said TAR signals while suppressing other received signal components.

17. The method according to claim 9, wherein the step of transmitting said radar probe signals includes transmitting from an aircraft.

18. The method according to claim 9, wherein the step of transmitting said radar probe signals includes transmitting from a surface ground station.

19. A radar system for detecting the presence of at least one threat providing electronic device placed in a given area of operation comprising:
a radar transmitter for transmitting a radar signal designated as a probe signal to said given area of operation to cause said at least one threat providing device to produce anomalous energy signals,
a radar receiver for receiving a reflected radar signal from said area of operation including said anomalous energy signals, designated as Target Anomalous Response (TAR) signals, said receiver further comprising a reference generator for generating a synthesized TAR reference signal,
a correlator responsive to said TAR signals and said synthesized TAR reference signal for providing a signal correlation time record, and
means responsive to said signal correlation time record for processing said record to detect said at least one threat producing device.

20. The radar system of claim 19, wherein the reference generator generates said synthetic TAR reference signal by filtering an un-TARed portion of said received signal and modulating said un-TARed portion with a replica of said probe signal.

* * * * *